US012612985B2

(12) United States Patent
Hammerschmidt et al.

(10) Patent No.: US 12,612,985 B2
(45) Date of Patent: Apr. 28, 2026

(54) CLAMP WITH TONGUE HAVING A NON-FLAT TRANSVERSE PROFILE

(71) Applicant: Oetiker Schweiz AG, Horgen (CH)

(72) Inventors: Maxim Hammerschmidt, Horgen (CH); Christoph Schneeberger, Horgen (CH)

(73) Assignee: OETIKER SCHWEIZ AG, Horgen (CH)

( * ) Notice: Subject to any disclaimer, the term of this patent is extended or adjusted under 35 U.S.C. 154(b) by 0 days.

(21) Appl. No.: 18/833,492

(22) PCT Filed: Jun. 12, 2023

(86) PCT No.: PCT/EP2023/065661
§ 371 (c)(1),
(2) Date: Jul. 26, 2024

(87) PCT Pub. No.: WO2023/237778
PCT Pub. Date: Dec. 14, 2023

(65) Prior Publication Data
US 2025/0243955 A1     Jul. 31, 2025

(30) Foreign Application Priority Data
Jun. 10, 2022    (DE) ..................... 10 2022 114 750.9

(51) Int. Cl.
*F16L 21/06*          (2006.01)
*F16B 2/08*           (2006.01)
          (Continued)

(52) U.S. Cl.
CPC .................. *F16L 21/06* (2013.01); *F16B 2/08* (2013.01); *F16L 33/025* (2013.01); *F16L 33/035* (2013.01)

(58) Field of Classification Search
CPC ......... F16L 21/06; F16L 33/02; F16L 33/035; F16L 33/025; F16L 33/03; Y10T 24/1457; F16B 2/08
See application file for complete search history.

(56) References Cited

U.S. PATENT DOCUMENTS 4,237,584 A * 12/1980 Oetiker ................. F16L 33/025
4,919,682 A *  4/1990 Bellazzi ................ F16L 33/035
          (Continued)

FOREIGN PATENT DOCUMENTS

WO      WO-2020169223 A1 *  8/2020  ............ F16L 33/025

OTHER PUBLICATIONS

WO-2020169223-A1—Machine Translation—English (Year: 2020).*

*Primary Examiner* — William S. Choi
(74) *Attorney, Agent, or Firm* — David L. Nocilly; Bond Schoeneck & King PLLC

(57) ABSTRACT

A band clamp including a clamping band (10) the two end portions (11, 12) of which overlap one another in the closed condition of the band clamp, the clamping band (10) having a tongue (13) arranged at the overlapped inner band portion (11), wherein a radially inner surface (13a) of the tongue (13) is configured to be pressed against an outer surface of an object to be clamped, and a tongue recess (14) provided in the overlapping outer band portion (12) and being complementary to the shape of the tongue (13) for receiving the tongue (13). The radially inner surface (13a) of the tongue (13) has a transverse profile including at least one projecting portion (17) protruding radially inward.

7 Claims, 4 Drawing Sheets

(51) Int. Cl.
    *F16L 33/025*     (2006.01)
    *F16L 33/035*     (2006.01)

(56)               References Cited

U.S. PATENT DOCUMENTS

| | | | | |
|---|---|---|---|---|
| 5,459,906 | A * | 10/1995 | Detable | F16L 33/035 |
| 6,463,632 | B2 * | 10/2002 | Craig, Jr. | F16L 33/025 |
| 6,560,823 | B1 * | 5/2003 | Craig, Jr. | F16L 33/025 |
| 6,598,269 | B2 * | 7/2003 | Oetiker | F16L 33/025 |
| 7,093,326 | B2 * | 8/2006 | Meier | F16L 33/025 |
| 8,443,492 | B2 * | 5/2013 | Racoillet | F16B 2/08 |
| 2006/0117534 | A1 * | 6/2006 | Craig, Jr. | F16L 33/025 |
| 2019/0257452 | A1 * | 8/2019 | Haensli | F16B 2/08 |

* cited by examiner 13c 13d 13 10b 11

CLAMP WITH TONGUE HAVING A NON-FLAT TRANSVERSE PROFILE

BACKGROUND OF THE INVENTION

Field of the Invention

The invention relates to a clamp made from a flat metal band or strip formed into a loop to be fastened around an object of substantially circular cross-section such as a boot, hose or pipe. Further, the present invention relates particularly to so-called stepless clamps, i.e., clamps having in their closed condition almost no uneven portions or steps at the inner surface.

Description of the Related Art

The documents WO 2018/082819 A1 and US 2009/0313792 A1 disclose a band clamp including a clamping band the two end portions of which overlap one another in the closed condition of the clamping clip, comprising a tongue arranged at the overlapped inner band portion, wherein a radially inner surface of the tongue is configured to be pressed against an outer surface of an object to be clamped, e.g. an outer surface of a boot, pipe or hose. A tongue recess or tongue channel provided in the overlapping outer band portion and being complementary to the shape of the tongue for receiving the tongue.

A disadvantage encountered with those conventional clamps resides in the non-satisfactory compression of the object to be clamped in the area covered by the tongue, in particular in the vicinity of the entry side of the tongue recess. This may result in that the sealing performance of conventional clamps has room for improvement.

BRIEF SUMMARY OF THE INVENTION

An object of the present invention is to improve compression characteristics and the sealing performance of the clamp, in particular in the vicinity of the entry side of the tongue recess.

This object is achieved by the clamp defined in claim 1. The other claims relate to preferred embodiments and a corresponding manufacturing method.

The invention relates to a band clamp including a clamping band the two end portions of which overlap one another in the closed condition of the band clamp. The clamping band comprises a tongue arranged at the overlapped inner band portion, wherein a radially inner surface of the tongue is configured to be pressed against an outer surface of an object to be clamped, and a tongue recess provided in the overlapping outer band portion and being complementary to the shape of the tongue for receiving the tongue. In this context the object to be clamped is not particularly limited and may be a hose, a pipe or a boot.

It is proposed that the radially inner surface of the tongue has a transverse profile including at least one projecting portion protruding radially inward. In this context, the transverse profile is a profile in a section perpendicular to the length direction of the band (i.e. in the radial direction of the band clamp in its closed configuration). In the tightened configuration of the clamp, the projecting portion results in a locally increased surface pressure improving the sealing performance in the area concerned.

Low exerted radial loads at the location where the tongue enters the recess are responsible for low sealing performance of the clamp. This inventive solution includes a projecting portion of the tongue at this problematic point.

In a preferred embodiment of the invention, the transverse profile is a V-shaped profile, wherein the central angle of the V-shape constitutes the projecting portion. The V-shaped profile is an easy and convenient low-cost solution regarding manufacturing.

Preferably, an angle between each of the lateral legs of the V-shape and a transverse direction in a non-tightened condition of the clamping band is 20° or more and 45° or less. Lower angles would dilute the effect of locally increasing the pressure to an area too large and steeper angles would lead to an excessive overall height of the profile, resulting in problems when inserting the tongue onto the tongue recess.

In alternative embodiments of the invention, the transverse profile is a T-shaped profile or a W-shaped profile.

The inventors propose that the projecting portion protrudes by at least 0.5 times a thickness of a material of the band over the lateral edges of the tongue. Lower heights would result in an insufficient effect of locally increasing the pressure because the protrusion would sink onto the material to be clamped too easily.

In a preferred embodiment of the invention, a height of the projecting portion over the lateral edges of the tongue is non-uniform in a longitudinal direction of the tongue. Preferably, a height of the projecting portion over the lateral edges of the tongue decreases, preferably to zero, when approaching an end of the tongue in the longitudinal direction of the tongue. This facilitates the insertion of the tongue into the tongue recess and avoids bunching of the tongue and harming the surface of the underlying object to be clamped, i.e. the hose, pipe or boot. The variable height of the projecting portion, in particular the V-shape profile along the length of the tongue enhances the stepless nature of the clamp, i.e. the uniformity of the sealing performance.

In order to concentrate the effect to an area in the vicinity of the entry side of the tongue recess, the tongue preferably includes an end potion where the transverse profile of the tongue is flat. The flat end part of the tongue ensures no harming of the underlying material and, thus a smooth sliding of the tongue. This facilitates the closure of the clamp on the underlying material and helps to avoid harming the underlying material (in particular a boot made from thermoplastic rubber material such as TPE).

In a preferred embodiment of the invention, the tongue includes, in the order from a free end backwards in the longitudinal direction, an end portion with a flat profile, followed by a wedge portion where the height of the projecting portion of the profile increases gradually, a central portion where the height of the projecting portion of the profile is constant and a root portion where the height decrease gradually to merge into the main portion of the clamping band.

Low exerted radial loads at the location where the tongue enters the recess are responsible for low sealing performance of the clamp. This inventive solution includes a V-shape at the tongue. The variable height of the V-shape profile along the length of the tongue enhances the steplessness of the clamp.

Further features and advantages will be apparent from the following description of the embodiments and figures. The entire description, claims and figures disclose features of the invention in specific embodiments and combinations. The person skilled in the art will also consider the features individually and combine them into further combinations or sub-combinations to adapt the invention, as defined in the claims, to his needs or to specific fields of application.

BRIEF DESCRIPTION OF THE SEVERAL VIEWS OF THE DRAWING(S)

The figures illustrate the following:

FIG. 3 is a perspective view of the tongue of a band clamp according to the first embodiment in an open configuration of the band;

FIG. 4 is a top view of the tongue of a band clamp according to the first embodiment in an open configuration of the band;

FIG. 5 is a side view of the tongue in the open configuration of the band;

DETAILED DESCRIPTION OF THE INVENTION

Figure 1:
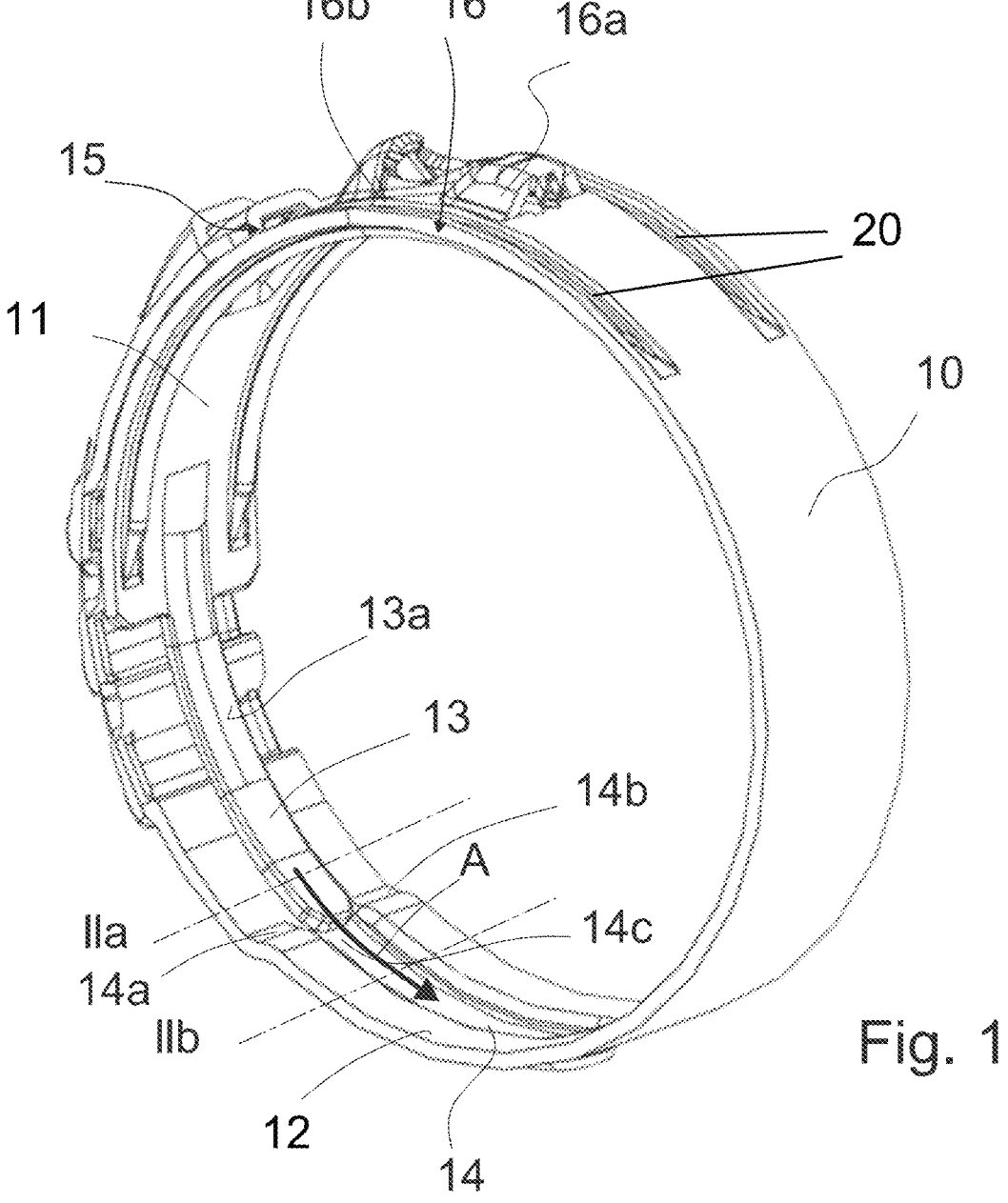
FIG. 1 illustrates a band clamp according to a first embodiment of the invention in a preassembled delivery condition.

FIG. 1 shows a band clamp according to a first embodiment of the 15 invention in a closed but non-tightened configuration.

The band clamp includes a clamping band 10 with two end portions 11, 12. In the closed condition of the clamp, the two end portions 11, 12 overlap one another. The overlapped inner band portion 11 of the clamping band 10 comprises a tongue 13. The tongue 13 is a portion having a width smaller than a width of the remainder of the band 10, the width amounting preferably to less than 40% of the total width, more preferably less than 30% of the total width.

A radially inner surface 13a of the tongue 13 is configured to be pressed against an outer surface of an object to be clamped (not illustrated). The clamping band 10 further includes a tongue recess 14 provided in the overlapping outer band portion 12 and being complementary to the shape of the tongue 13 for receiving the tongue 13.

In the embodiment of FIG. 1, the band clamp is formed as a low profile clamp wherein the other end portion of the clamping 35 band 10 opposite to the tongue 13 comprises a structure 15 with openings configured to engage with a corresponding hook 16 on the inner end portion 11 of the clamping band 10, wherein the hook 16 includes a tensioning hook 16a as a gripping structure for a tensioning tool and a load retaining hook 16b for retaining the load once the clamp is closed. However, the invention is not limited to the low profile clamps and can be applied to other types of clamps such as ear clamps, likewise.

When the clamp is tensioned using the tool, the tongue 13 is moved into the tongue recess 14 as illustrated by an arrow A in FIG. 1.

Figures 2A, 2B:
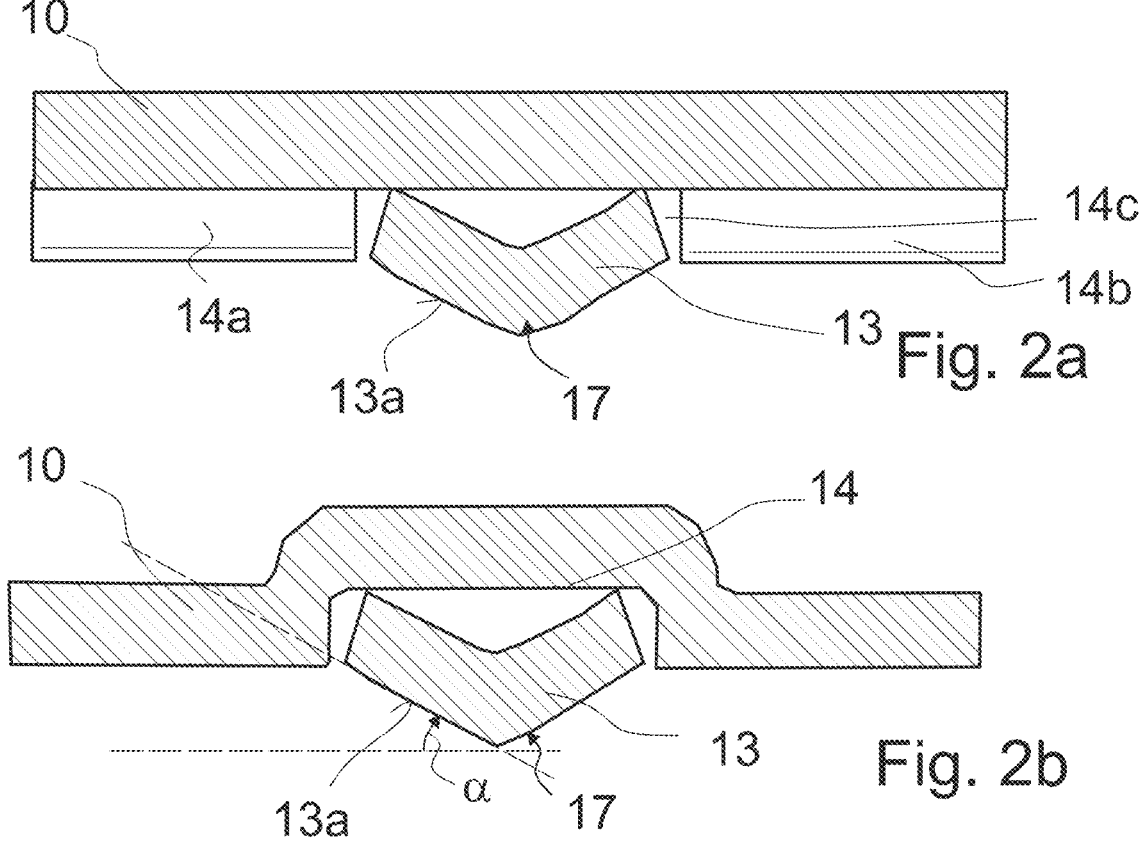
FIG. 2a is a sectional view of the band clamp according to the first embodiment taken along section line IIa in FIG. 1 but in a tightened condition of the clamp.
FIG. 2b is a sectional view of the band clamp according to the first embodiment taken along section line IIb in FIG. 1 but in a tightened condition of the clamp.

FIGS. 2a and 2b show sections along the dash-dotted lines IIa and IIb in FIG. 1 after the insertion of the tongue 13 into the tongue recess 14.

The tongue recess 14 includes an entry port opened in a circumferential direction of the clamp to receive the tongue 13. Steps 14a, 14b are formed in the clamping band on both sides of the entry port of the tongue recess 14 to bring the outer band portion 12 to a level of the object to be clamped, i.e. substantially the level of the radially inner surface 13a of the tongue 13 in the tightened configuration of the clamp. The steps 14a and 14b are perpendicular to the longitudinal clamp band direction as shown in FIG. 1. However, they may also be formed at an angle to the longitudinal direction to provide a funnel-shaped tongue recess 14. The root of the tongue 13 may then have a complementary trapezoidal root part (not shown).

As illustrated in FIGS. 2a and 2b, the radially inner surface 13a of the tongue 13 of a band clamp according to the invention has a transverse profile including at least one projecting portion 17 protruding radially inward. In the tightened configuration of the clamp, the projecting portion 17 results in a locally increased surface pressure improving the sealing performance in the area concerned.

In the embodiment of FIGS. 1 to 5, the transverse profile is a V-shaped profile, wherein the central angle of the V-shape constitutes the projecting portion 17. An angle a between each of the lateral legs of the V-shape and a transverse direction in a non-tightened condition of the clamping band 10 is 20° or more and 45° or less. The projecting portion 17 protrudes roughly 0.5 times a thickness of a material of the band 10 over the lateral edges of the tongue 13.

Figures 3, 4, 5:
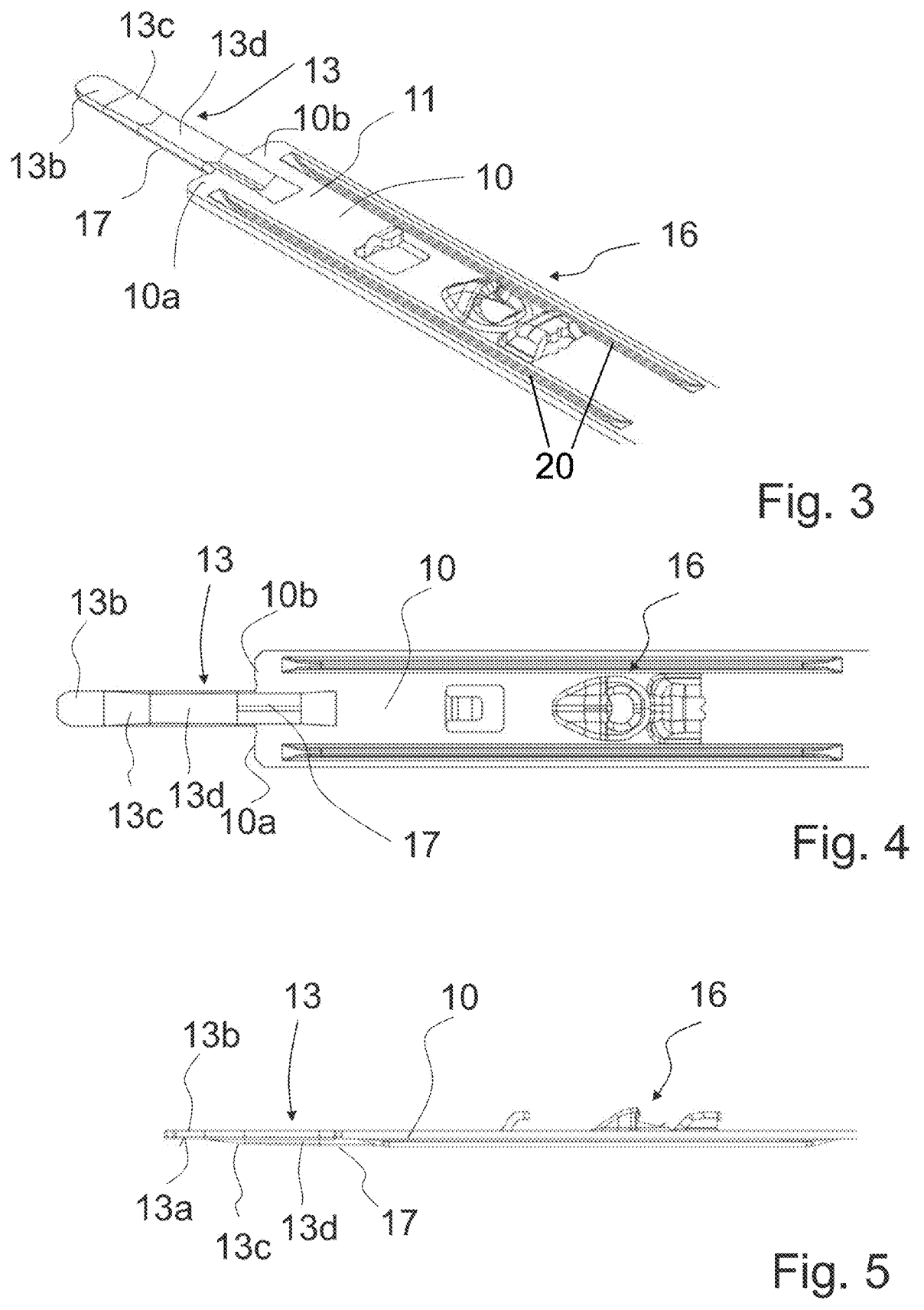

FIG. 3 is a perspective view of the tongue 13 in an open configuration of the band 10, FIG. 4 is a top view of the tongue in the open configuration of the band 10, and FIG. 5 is a side view of the tongue in the open configuration of the band 10. A height of the projecting portion 17 over the lateral edges of the tongue 13 is non-uniform in a longitudinal direction of the tongue 13. The tongue 13 includes a root portion at shoulder portions 10a, 10b where the width of the band 10 is reduced from the full width of the main portion of the clamping band 10 to the width of the tongue 13, wherein the reduction may take place in a stepwise or gradual manner. The tongue 13 further includes an end section 13b on a free end of the tongue 13 opposite to the root portion.

The end section 13b has a flat profile and is followed in the longitudinal direction by a wedge section 13c where the height of the projecting portion 17 of the profile increases gradually, a central section 13d where the height of the projecting portion 17 of the profile is constant, wherein the ridge formed by the profile extends well beyond the shoulder portions 10a, 10b of the band 10 into a section having the full width of the band 10, i.e. the projecting portion 17 is extended beyond the length of the tongue into the body of the inner band portion 11. A length of the end section 13b and the wedge section 13c amounts to somewhere between 15 and 30% of the total length of the tongue 13. The lengths of the different sections 13b-13d of the tongue 13 is designed to allow for a sufficient flexibility in the end section 13b, a smooth insertion into the tongue 13 recess by virtue of the wedge section 13b, avoidance of harming the underlying material of the object to be clamped, and a suitable placement of the area with increased pressure at an entry of the tongue recess 14 due to the structure and length of the central section 13d.

Side rails 20 are formed on both lateral sides of the inner band end portion 11. They protrude radially inwards to enhance the sealing performance on the object to be clamped. Further, they stiffen the band material against kinking or bending during the clamp tightening process. The side rails 20 are overlapping the wedge section 13c of the tongue 13 when seen from a side view perpendicular to the longitudinal direction. This improves the continuous sealing performance along the complete clamp circumference and hence ensures the stepless character of the clamp.

Figures 6A, 6B:
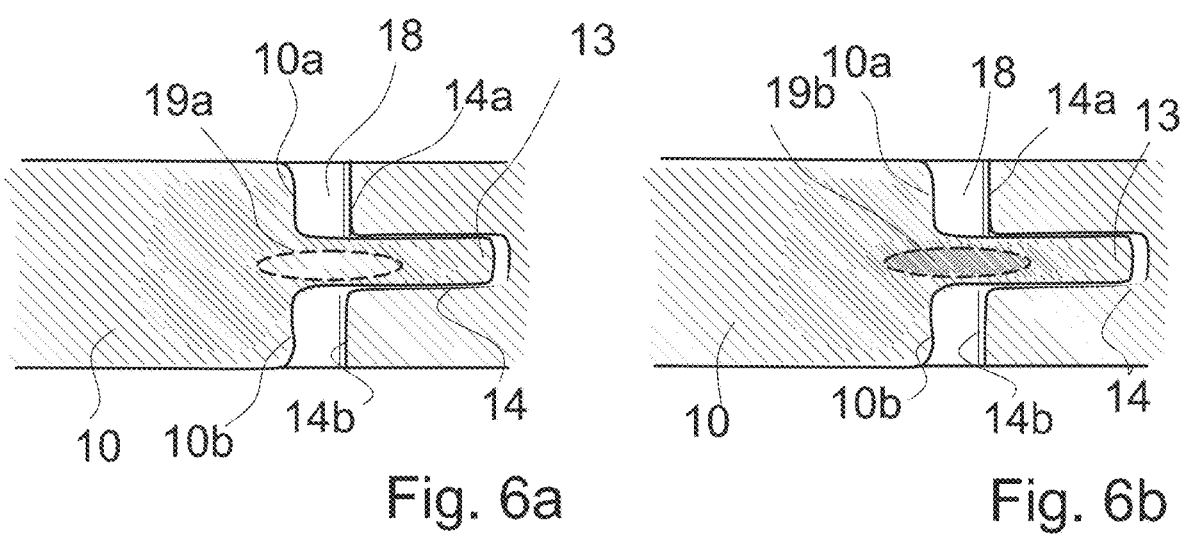
FIG. 6a illustrates a pressure distribution in a tightened configuration of the band in the vicinity of the entry portion of the tongue recess of a conventional band clamp.
FIG. 6b illustrates the pressure distribution as in FIG. 6a for a band clamp according to the invention.

FIG. 6a illustrates a pressure distribution in a tightened in the vicinity of the entry portion of the tongue recess 14 of a conventional band clamp and FIG. 6b illustrates the pressure distribution in the same area for a band clamp according to the invention, wherein denser hatchings correspond to higher local pressure. The drawings focus on the sealing performance of the tongue 13. The effect of the side rails 20 is omitted for keeping the pressure distribution simple and allow better understanding.

Note that a gap 18 in the circumferential direction remains between the shoulders 10a, 10b of the band 10 and the steps 14a, 14b left and right from the tongue recess 14.

In clamps according to the prior art, the gap 18 results in a portion 19a with reduced pressure illustrated in FIG. 6a as a dashed ellipse, whereas the projecting portion 17 of the tongue 13 results in a region 19b with increased surface pressure in the same area, as illustrated in FIG. 6b. The skilled person will appreciate that the pressure distribution of the clamp according to the invention (FIG. 6b) more concentrated at an area at an entry of the recess than in FIG. 6a.

Figure 7:
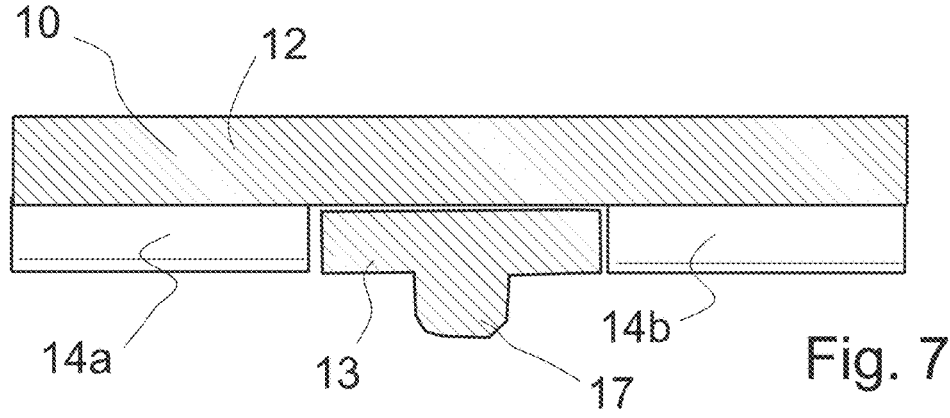
FIG. 7 illustrates a band clamp according to a second embodiment of the invention with a tongue having a T-shaped profile.
Figure 8:
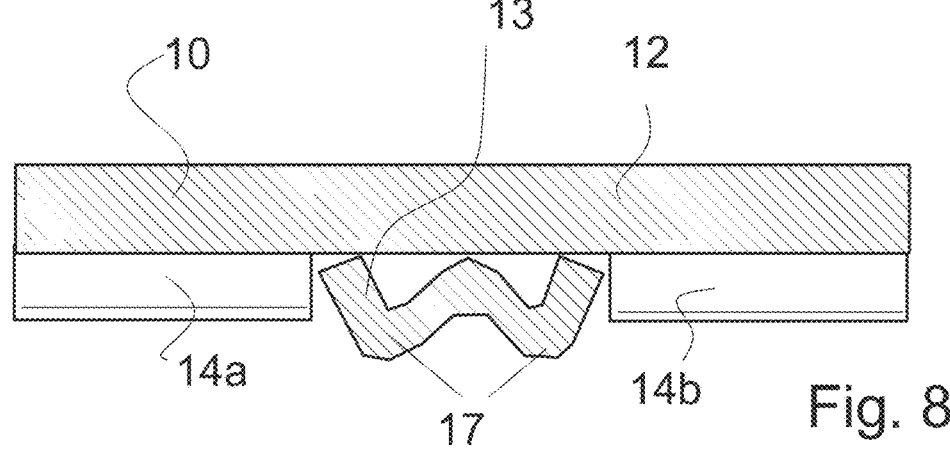
FIG. 8 illustrates a band clamp according to a third embodiment of the invention with a tongue having a W-shaped profile.

FIGS. 7 and 8 illustrate further embodiments of the invention. In order to avoid repetition, the following description of these further embodiments is essentially limited to differences from the first embodiment of the invention. Because of the unchanged features, the skilled person is referred to the description of the first embodiment. The same reference signs are used for features of the further embodiments that have the same or similar effect in order to emphasize the similarities.

FIG. 7 illustrates an embodiment where the transverse profile of the tongue 13 is a T-shaped profile and FIG. 8 illustrates an embodiment where the transverse profile of the tongue 13 is a W-shaped profile with two ridges as projecting portions 17 provided on the tongue 13.

LIST OF REFERENCE NUMBERS

10 band
10a, 10b shoulder portions
11 inner band end portion
12 outer band end portion
13 tongue
13a inner surface of the tongue
13b end section
13c wedge section
13d central section
14 tongue recess
14a, 14b steps
14c entry port of tongue recess
15 structure
16 hook
17 projecting portion
18 gap
19a region with reduced pressure
19b region with reduced pressure
20 side rails

The invention claimed is:

1. A band clamp including a clamping band having two end portions of which overlap one another at an overlapped inner band portion in a closed condition of the band clamp, the clamping band comprising:

a tongue arranged at the overlapped inner band portion, wherein a radially inner surface of the tongue is configured to be pressed against an outer surface of an object to be clamped, wherein the tongue has lateral edges and a root portion at shoulder portions of the clamping band where a width of the clamping band is reduced from a full width of a main portion of the clamping band to a width of the tongue and a tongue recess provided in an overlapping outer band portion and being complementary to a shape of the tongue for receiving the tongue, wherein the radially inner surface of the tongue has a transverse profile including at least one projecting portion protruding radially inward and a height of the at least one projecting portion over the lateral edges of the tongue is non-uniform in a longitudinal direction of the tongue, and wherein the tongue recess includes an entry port opened in a circumferential direction of the clamp to receive the tongue and a pair of steps are formed in the clamping band on both sides of the entry port of the tongue recess to bring the outer band portion to a level of the object to be clamped, wherein the pair of steps extend at angle to the longitudinal direction of the clamping band that is selected from the group consisting of a perpendicular angle and an oblique angle that provides a funnel-shaped tongue recess, wherein the tongue includes an end portion where the transverse profile of the tongue is flat, a wedge portion where the height of the at least one projecting portion of the profile increases gradually, a central portion where the height of the at least one projecting portion of the profile is constant, and the root portion where the height decreases to merge into the main portion of the clamping band, and wherein a ridge formed by the at least one projecting portion extends beyond the shoulder portions of the clamping band into the main portion having the full width of the clamping band.

2. The band clamp according to claim 1, wherein the transverse profile is a V-shaped profile, wherein a central angle of the V-shape constitutes the at least one projecting portion.

3. The band clamp according to claim 2, wherein an angle between each of the lateral legs of the V-shape and a transverse direction in a non-tightened condition of the clamping band is 20° or more.

4. The band clamp according to claim 1, wherein the tongue has lateral edges and the at least one projecting portion protrudes by at least 0.5 times a thickness of a material of the band over the lateral edges of the tongue.

5. The band clamp according to claim 1, wherein a length of the end portion and the wedge portion amounts to between 15 and 30 percent of a total length of the tongue.

6. A band clamp including a clamping band having two end portions of which overlap one another at an overlapped inner band portion in a closed condition of the band clamp, the clamping band comprising:

a tongue arranged at the overlapped inner band portion, wherein a radially inner surface of the tongue is configured to be pressed against an outer surface of an object to be clamped, and a tongue recess provided in an overlapping outer band portion and being complementary to a shape of the tongue for receiving the tongue, wherein the radially inner surface of the tongue has a transverse profile including at least one projecting portion protruding radially inward, and wherein the transverse profile is a T-shaped profile.

7. A band clamp including a clamping band having two end portions of which overlap one another at an overlapped inner band portion in a closed condition of the band clamp, the clamping band comprising:

a tongue arranged at the overlapped inner band portion, wherein a radially inner surface of the tongue is configured to be pressed against an outer surface of an object to be clamped, and a tongue recess provided in an overlapping outer band portion and being complementary to a shape of the tongue for receiving the tongue, wherein the radially inner surface of the tongue has a transverse profile including at least one projecting portion protruding radially inward, and wherein a pair of side rails protruding radially inwards are formed on both lateral sides of the inner band portion, and, when seen from a side view perpendicular to a longitudinal direction of the band clamp, the side rails overlap a region where the tongue has the at least one projecting portion.

* * * * *